United States Patent
Yu

(10) Patent No.: US 10,488,267 B2
(45) Date of Patent: Nov. 26, 2019

(54) METHOD FOR PROCESSING TEMPERATURE VALUES OF AN ELECTRONIC DEVICE AND ELECTRONIC DEVICE UTILIZING THE SAME

(71) Applicant: Quanta Computer Inc., Taoyuan (TW)

(72) Inventor: Chun-Jie Yu, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 166 days.

(21) Appl. No.: 15/623,621

(22) Filed: Jun. 15, 2017

(65) Prior Publication Data

US 2018/0143080 A1   May 24, 2018

(30) Foreign Application Priority Data

Nov. 18, 2016   (TW) .............................. 105137781 A

(51) Int. Cl.
| | |
|---|---|
| *G01K 1/02* | (2006.01) |
| *G01K 3/00* | (2006.01) |
| *G05D 23/19* | (2006.01) |
| *G06F 1/20* | (2006.01) |
| *G01K 13/00* | (2006.01) |

(52) U.S. Cl.
CPC .............. *G01K 1/02* (2013.01); *G01K 3/005* (2013.01); *G05D 23/1919* (2013.01); *G06F 1/203* (2013.01); *G01K 13/00* (2013.01); *G05D 23/1917* (2013.01)

(58) Field of Classification Search
CPC .......... G01K 1/02; G01K 3/005; G01K 13/00; G05D 23/1919; G05D 23/1917; G06F 1/203

See application file for complete search history.

(56) References Cited

U.S. PATENT DOCUMENTS

| | | | | |
|---|---|---|---|---|
| 6,112,164 A | * | 8/2000 | Hobson | G06F 1/206 |
| | | | | 702/132 |
| 6,169,442 B1 | * | 1/2001 | Meehan | G01K 7/01 |
| | | | | 327/307 |
| 6,191,546 B1 | * | 2/2001 | Bausch | G06F 1/206 |
| | | | | 318/452 |

(Continued)

*Primary Examiner* — Lisa M Caputo
*Assistant Examiner* — Philip L Cotey
(74) *Attorney, Agent, or Firm* — McClure, Qualey & Rodack, LLP

(57) ABSTRACT

An electronic device includes a thermal sensor and a microprocessor. The thermal sensor is configured to sense an internal temperature of the electronic device and provide multiple temperature values according to the sensing result. The microprocessor is coupled to the thermal sensor and configured to receive the temperature values. The microprocessor determines a high threshold value and a low threshold value according to the temperature values and filters the temperature values in sequence according to the high threshold value and the low threshold value. When one of the temperature values is not higher than the high threshold value and is not lower than the low threshold value, the microprocessor outputs the temperature value, and when the temperature value is higher than the high threshold value or is lower than the low threshold value, the microprocessor outputs a predetermined temperature value instead of the temperature value.

10 Claims, 4 Drawing Sheets

(56) References Cited

U.S. PATENT DOCUMENTS

| | | | | |
|---|---|---|---|---|
| 6,336,593 | B1* | 1/2002 | Bhatnagar | G05D 23/1917 |
| | | | | 236/78 R |
| 8,928,393 | B1* | 1/2015 | Cobo | G01K 3/005 |
| | | | | 327/512 |
| 2003/0158696 | A1* | 8/2003 | Gold | G06F 1/206 |
| | | | | 702/132 |
| 2003/0158697 | A1* | 8/2003 | Gold | G06F 1/206 |
| | | | | 702/132 |
| 2004/0131104 | A1* | 7/2004 | Seferian | G01K 7/01 |
| | | | | 374/178 |
| 2005/0114061 | A1* | 5/2005 | Gauthier | G01K 15/00 |
| | | | | 702/99 |
| 2009/0112506 | A1* | 4/2009 | Kazama | G01K 7/42 |
| | | | | 702/130 |
| 2009/0161726 | A1* | 6/2009 | Miyamoto | G01K 7/01 |
| | | | | 374/172 |
| 2009/0299543 | A1* | 12/2009 | Cox | G06F 1/203 |
| | | | | 700/299 |
| 2010/0231286 | A1* | 9/2010 | Kuusilinna | G01K 7/425 |
| | | | | 327/512 |
| 2012/0123609 | A1* | 5/2012 | Kuo | H05B 1/0263 |
| | | | | 700/300 |
| 2014/0094933 | A1* | 4/2014 | Forbell | G05B 19/0428 |
| | | | | 700/12 |
| 2015/0257310 | A1* | 9/2015 | DeSouza | H05K 7/20836 |
| | | | | 361/679.46 |
| 2015/0350407 | A1* | 12/2015 | Hsu | H04M 1/72569 |
| | | | | 455/418 |
| 2016/0048347 | A1* | 2/2016 | Rangarajan | G06F 1/206 |
| | | | | 711/156 |
| 2017/0235598 | A1* | 8/2017 | Yang | G06F 9/4806 |
| | | | | 719/320 |

* cited by examiner

METHOD FOR PROCESSING TEMPERATURE VALUES OF AN ELECTRONIC DEVICE AND ELECTRONIC DEVICE UTILIZING THE SAME

CROSS REFERENCE TO RELATED APPLICATIONS

This Application claims priority of Taiwan Patent Application No. 105137781, filed on Nov. 18, 2016, the entirety of which is incorporated by reference herein.

BACKGROUND OF THE INVENTION

Field of the Invention

The invention relates to a method for processing temperature values of an electronic device, which is capable of filtering out the extremes of the sensed temperature values and preventing the heat-dissipation mechanism of the electronic device from overreacting to a transient and dramatic change in the sensed temperature values.

Description of the Related Art

Electronic devices are typically equipped with a temperature sensing device to sense the temperature inside of the electronic device and to perform heat-dissipation control according to the sensed temperatures. This is accomplished, for example, by controlling the operation of a fan or reducing the operating frequency of internal components of the electronic device so as to prevent the components within the electronic device from being damaged due to high temperatures.

However, if the electronic device directly performs the heat-dissipation control according to the sensed temperatures, it may cause some unnecessary operation, for example, repeatedly changing the fan speed, due to a transient and dramatic change in temperature, resulting in unpleasant noise.

Therefore, a novel method for processing temperature values of an electronic device is required, which is capable of filtering out the extremes of the sensed temperature values and preventing the heat-dissipation mechanism of the electronic device from overreacting to a transient and dramatic change of the sensed temperature values.

BRIEF SUMMARY OF THE INVENTION

Electronic device and a method for processing temperature values of an electronic device are provided. An exemplary embodiment of an electronic device comprises a thermal sensor and a microprocessor. The thermal sensor is configured to sense an internal temperature of the electronic device and provide a plurality of temperature values according to the sensing result. The microprocessor is coupled to the thermal sensor and configured to receive the temperature values. The microprocessor determines a high threshold value and a low threshold value according to the temperature values and filters the temperature values in sequence according to the high threshold value and the low threshold value. When one of the temperature values is not higher than the high threshold value and is not lower than the low threshold value, the microprocessor outputs the temperature value, and when the temperature value is higher than the high threshold value or is lower than the low threshold value, the microprocessor outputs a predetermined temperature value instead of the temperature value.

An exemplary embodiment of a method for processing temperature values of an electronic device comprise: sensing an internal temperature of the electronic device and generating a plurality of temperature values according to the sensing result; determining a high threshold value and a low threshold value according to the temperature values; and filtering the temperature values in sequence according to the high threshold value and the low threshold value. When one of the temperature values is not higher than the high threshold value and is not lower than the low threshold value, the temperature value is outputted, and when the temperature value is higher than the high threshold value or is lower than the low threshold value, a predetermined temperature value is outputted instead of the temperature value.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
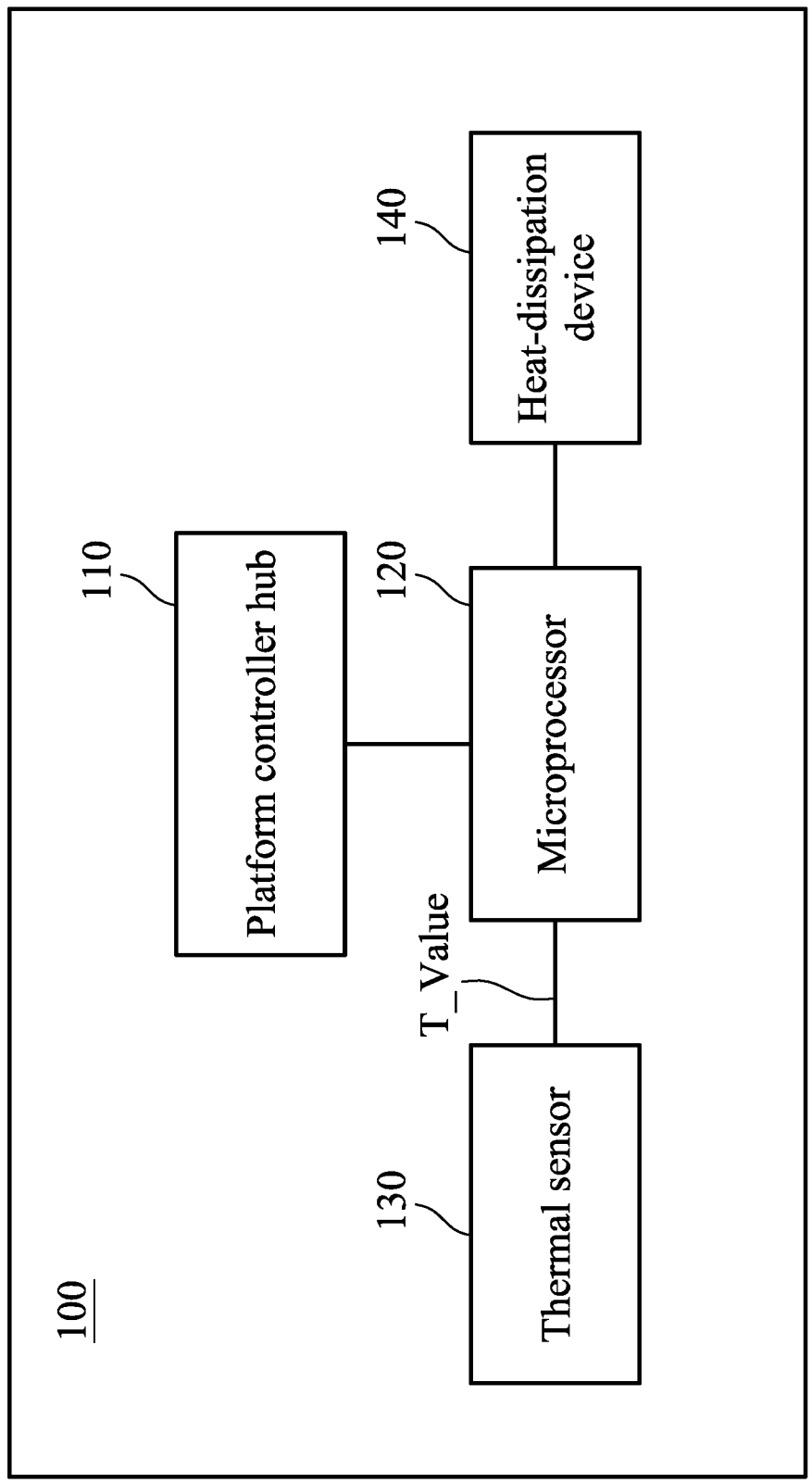
FIG. 1 is a block diagram of an electronic device according to an embodiment of the invention.

FIG. 1 is a block diagram of an electronic device according to an embodiment of the invention. The electronic device 100 may comprise at least a Platform Controller Hub (PCH) 110, a microprocessor 120, a thermal sensor 130, and a heat-dissipation device 140.

The thermal sensor 130 is configured to sense an internal temperature of the electronic device 100 and provide a plurality of temperature values T_Value to the microprocessor 120 according to the sensing result. The thermal sensor 130 is typically located in the vicinity of the important components inside of the electronic device system to be protected, for example, located near a central processing unit (CPU), for continuously sensing environment temperature around the important components, and keeps providing the sensed temperature values.

The microprocessor 120 is coupled to the thermal sensor 130, the platform controller hub 110 and the heat-dissipation device 140. The microprocessor 120 receives the temperature values T_Value through a corresponding interface from the thermal sensor 130, and processes the received temperature values T_Value. The microprocessor 120 may determine whether to perform active heat-dispassion according to the processed temperature values T_Value', and accordingly control the operations of the heat-dissipation device 140. Or, the microprocessor 120 may provide the processed temperature values T_Value' to the platform controller hub 110 comprised in the CPU, and whether to perform passive heat-dispassion may be determined by the platform controller hub 110.

It should be noted that in order to clarify the concept of the invention, FIG. 1 presents a simplified block diagram, in which only the elements relevant to the invention are shown. For the persons with ordinary skill in the art, it is easy to understand that the electronic device may comprise other components not shown in FIG. 1 to provide specific function. Therefore, the invention should not be limited to what is shown in FIG. 1.

In general, the active heat-dispassion refers to the heat dissipation mechanism initiated by the microprocessor 120, for example, to control the operation of the heat-dissipation device 140 (for example, to control the speed and operation of the fan), and to control the CPU or other hardware devices (not shown) in the electronic device system to decrease its operating frequency, or others. Passive heat dissipation refers to the heat dissipation mechanism initiated by the CPU, for example, to decrease the operating frequency of the CPU, or others.

Since the response time of the active heat-dispassion mechanism is longer than that of the passive heat-dispassion mechanism, the operation of the active heat-dispassion mechanism is more easily to be perceived by the user. Traditionally, in order to avoid the heat-dissipation mechanism to overreact to a transient and dramatic change in temperature, the following methods will be adopted, including:

(1). After the electronic device powers on, stop updating the sensed temperature values for a period of time. The sensed temperature values will be updated and reported after the end of the period. However, the method can only be applied at a specific time (i.e., right after powering on the electronic device).

(2). Reporting a moving average of the sensed temperature values to the corresponding temperature control device (for example, the internal hardware device or firmware module of the microprocessor 120 to initiate the active heat-dispassion mechanism, or the platform controller hub 110, or the like). However, the method cannot reflect the actual temperature in real time.

(3). Reporting the temperature values based on different temperature segments. For example, when the sensed temperature value exceeds a high temperature threshold for the first time, the previous obtained temperature value is reported to the corresponding temperature control device. If the sensed temperature value continuously exceeds the high temperature threshold for several times, the high temperature threshold is reported to the corresponding temperature control device. If the sensed temperature value still continuously exceeds the high temperature threshold, the true temperature value is reported to the corresponding temperature control device. However, the problem of overreacting to a transient and dramatic change in temperature in the non-high temperature region still cannot be avoided.

To solve these problems, a novel method for processing temperature values of an electronic device is proposed, which is capable of filtering out the extremes of the sensed temperature values and preventing the heat-dissipation mechanism of the electronic device from overreacting to a transient and dramatic change of the sensed temperature values.

According to an embodiment of the invention, the microprocessor 120 may determine a high threshold value H_OT and a low threshold value L_OT according to the received temperature values T_Value, and filter the received temperature values T_Value in sequence according to the high threshold value H_OT and the low threshold value L_OT.

Figure 2:
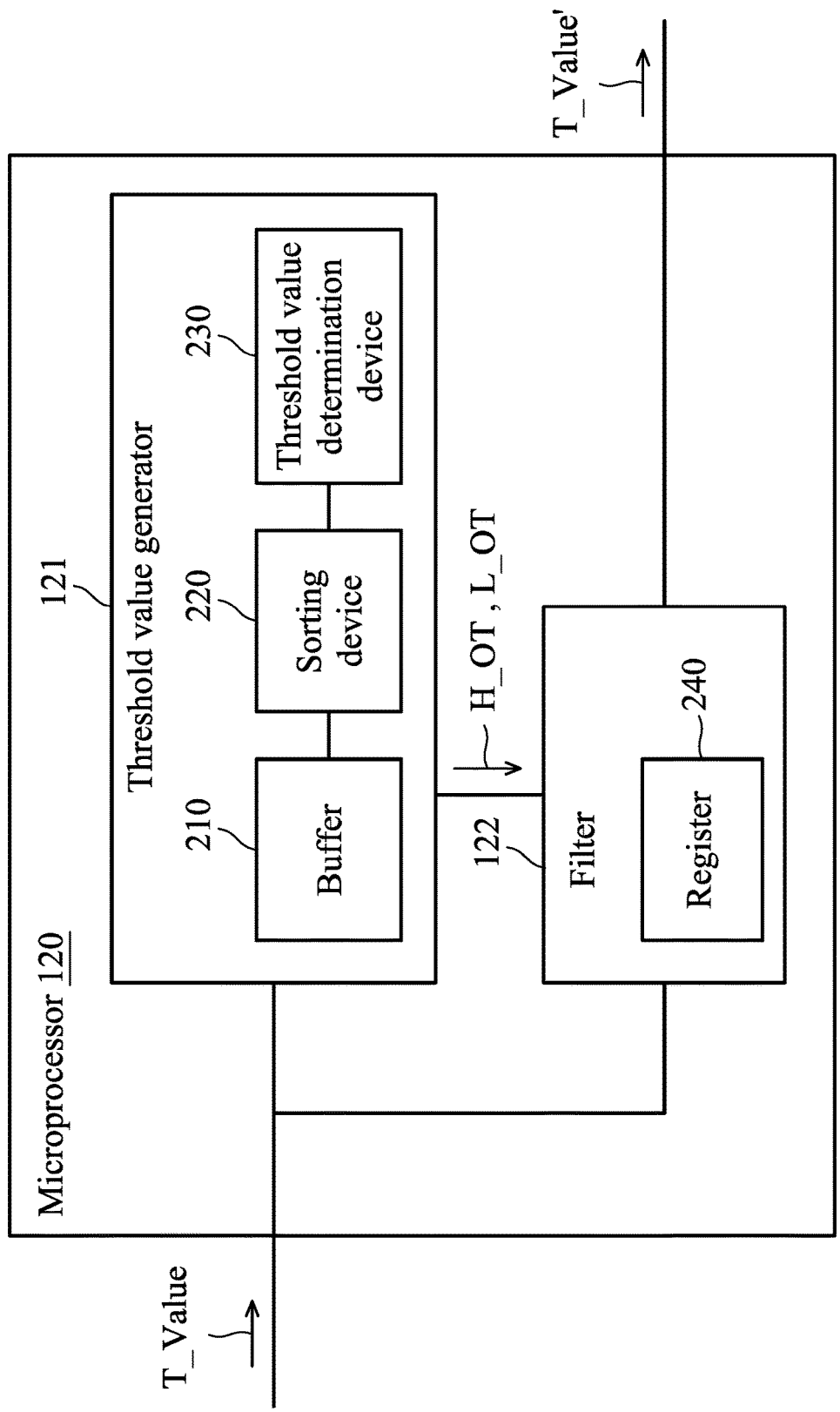
FIG. 2 is a block diagram of a microprocessor according to an embodiment of the invention.

FIG. 2 is a block diagram of a microprocessor according to an embodiment of the invention. The microprocessor 120 may comprise a threshold value generator 121 and a filter 122. The threshold value generator 121 may determine a high threshold value H_OT and a low threshold value L_OT according to the received temperature values T_Value. The filter 122 may filter the received temperature values T_Value in sequence according to the high threshold value H_OT and the low threshold value L_OT, and generate and output the processed temperature values T_Value'.

The threshold value generator 121 may comprise a buffer 210, a sorting device 220 and a threshold value determination device 230. The buffer 210 is configured to store the received temperature values T_Value. According to an embodiment of the invention, the buffer 210 may be the First Input First Output (FIFO) buffer. According to an embodiment of the invention, the size of the buffer 210 may be set to be greater than or equal to a predetermined number N, where N is a positive integer. For example, the size of the buffer 210 may be set to be greater than or equal to 4. Therefore, the buffer 210 may be configured to store at least four sensed temperature values T_Value.

The sorting device 220 may be configured to sort the temperature values T_Value stored in the buffer 210 according to a predetermined rule, to generate a sequence of sorted temperature values. According to an embodiment of the invention, the predetermined rule may be arranging the values in an ascending or descending order.

The threshold value determination device 230 may be configured to select a first value L among the temperature values selected from a beginning of the sequence of sorted temperature values to a median of the sequence of sorted temperature values, select a second value H among the temperature values selected from the median of the sequence of sorted temperature values to the last of the sequence of sorted temperature values, determine an offset IQ according to the first value L and the second value H and determine the high threshold value H_OT and the low threshold value L_OT according to the first value L, the second value H and the offset IQ.

According to an embodiment of the invention, the offset IQ relates to the difference between the first value L and the second value H, the low threshold value L_OT is a calculation result of the first value L and the offset IQ, and the high threshold value H_OT is a calculation result of the second value H and the offset IQ.

For example, according to an embodiment of the invention, the size of the buffer 210 may be designed as a multiple of 4. The sorting device 220 may arrange the temperature values stored in the buffer 210 in an ascending order. The threshold value determination device 230 may select the (N/4)-th data in the sequence of sorted temperature values as the first value L, and select the (3*N/4)-th data in the sequence of sorted temperature values as the second value H. The threshold value determination device 230 may further multiply the difference (H-L) of the second value and the first value by a predetermined scale factor to obtain the offset IQ. The high threshold value H_OT may be obtained from the calculation of H_OT=MAX{H+IQ,0}, and the low threshold value L_OT may be obtained from the calculation of L_OT=MAX{L−IQ,0}, where the function MAX{ } is to take the maximum value.

The threshold value generator 121 may provide the high threshold value H_OT and the low threshold value L_OT to the filter 122. The filter 122 may determine whether the received temperature value T_Value is between the high threshold value H_OT and the low threshold value L_OT one by one. When the temperature value T_Value is between the high threshold value H_OT and the low threshold value L_OT, the filter 122 directly outputs this temperature value T_Value. When the temperature value T_Value is higher than the high threshold value H_OT or is lower than the low threshold value L_OT, this temperature value T_Value is determined as being out of the proper range. In this manner, the filter 122 may output a predetermined temperature value instead of this temperature value.

According to an embodiment of the invention, the predetermined temperature value is a temperature value which was previously output by the filter 122 of the microprocessor 120. In other words, when the temperature value T_Value currently being processed is higher than the high threshold value H_OT or is lower than the low threshold value L_OT, this temperature value is determined as not falling in the proper range. In this manner, the filter 122 may use a previously (the latest) output temperature value to replace the current temperature value T_Value, and output the previously (the latest) output temperature value. According to an embodiment of the invention, the filter 122 may comprise a register 240 to record the latest output temperature value Last_Value and buffer the received temperature value T_Value.

Note that the threshold value generator 121 and the filter 122 in the microprocessor 120 may be implemented by hardware devices or a combination of hardware devices and software to perform the functions described above. Those skilled in the art will appreciate that any components or any set of components that perform the functions described above may be considered as one or more processors that control the functions described above.

Figure 3:
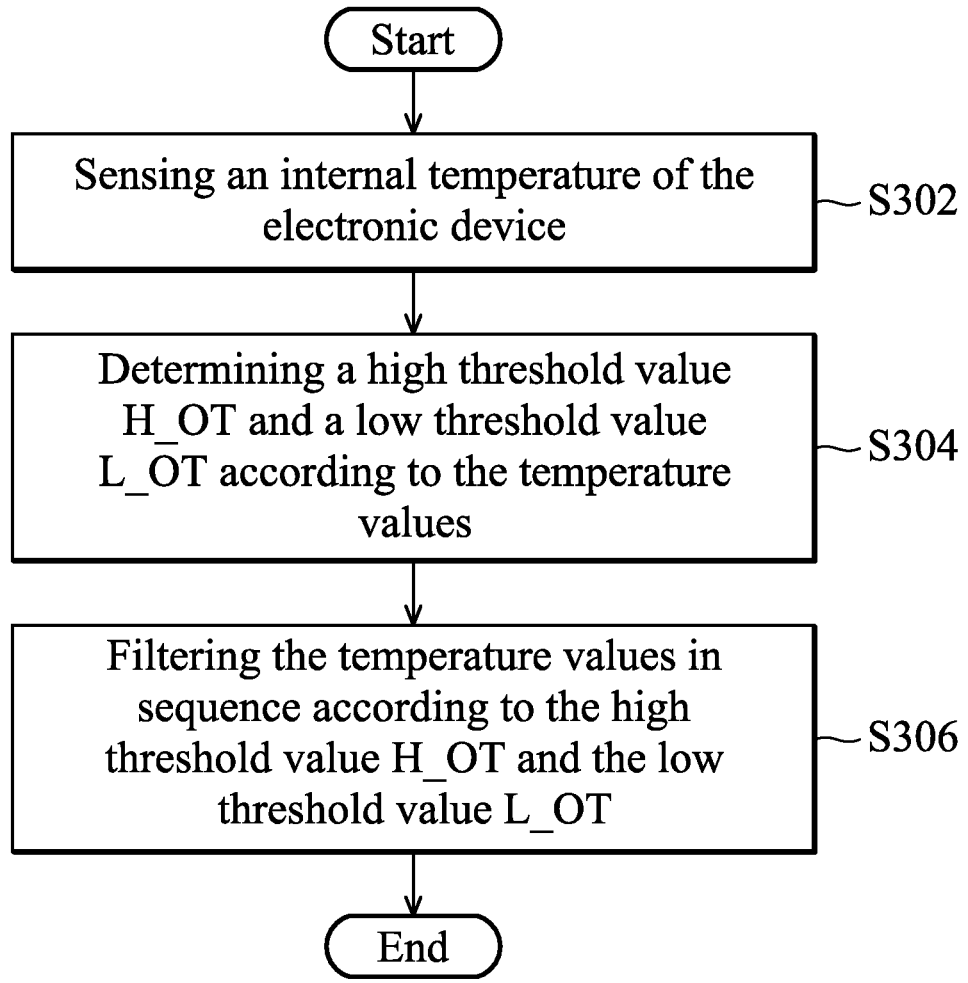
FIG. 3 is a flow chart showing a method for processing temperature values of an electronic device according to an embodiment of the invention.

FIG. 3 is a flow chart showing a method for processing temperature values of an electronic device according to an embodiment of the invention. First of all, the thermal sensor 130 senses the internal temperature of the electronic device to generate a plurality of temperature values according to the sensing result (Step S302). Next, the microprocessor 120 determines a high threshold value H_OT and a low threshold value L_OT according to the temperature values (Step S304). Finally, the microprocessor 120 filters the temperature values in sequence according to the high threshold value H_OT and the low threshold value L_OT (Step S306).

Figure 4:
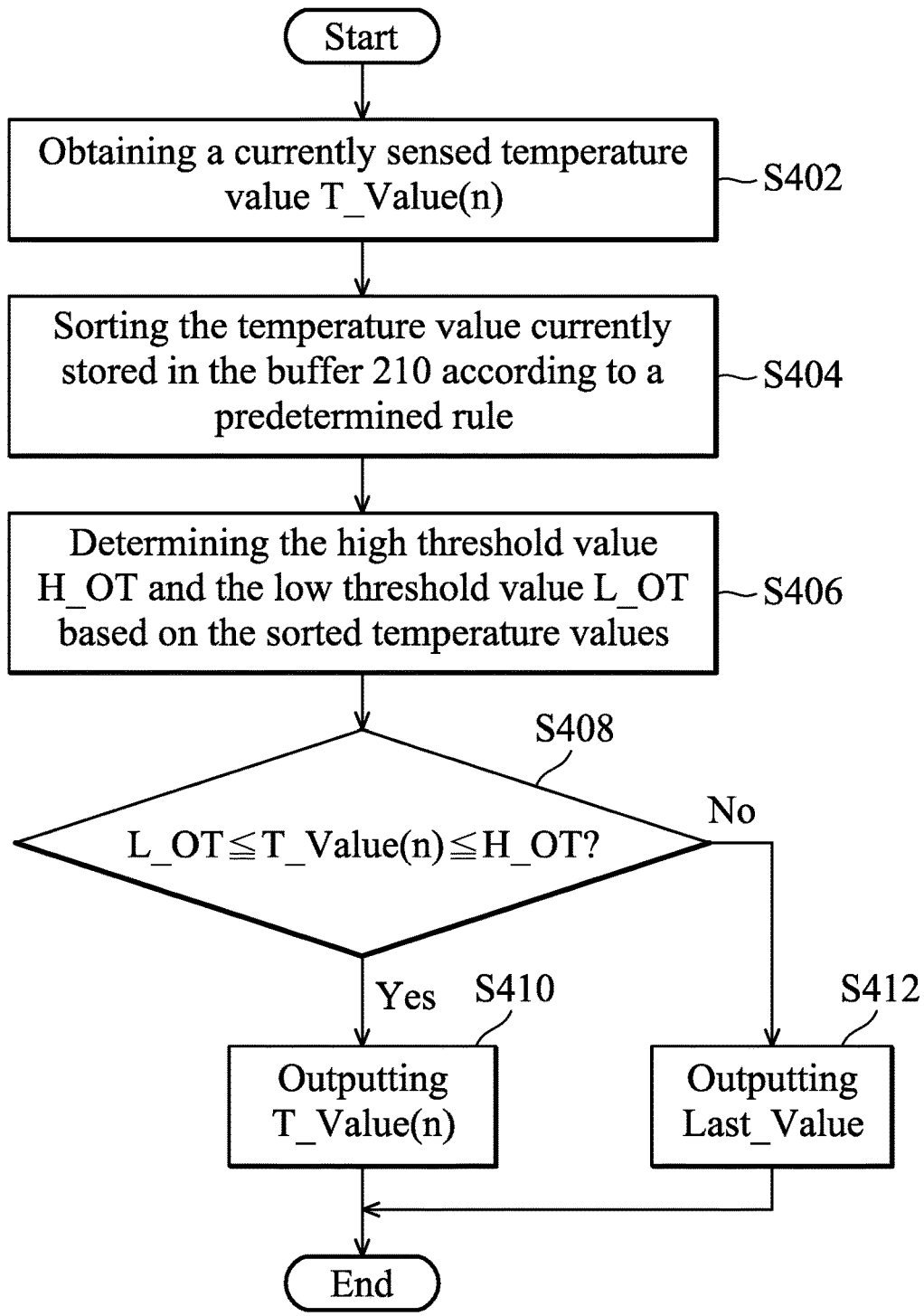
FIG. 4 is a flow chart showing a method for processing temperature values of an electronic device according to an embodiment of the invention.

FIG. 4 is a flow chart showing a method for processing temperature values of an electronic device according to an embodiment of the invention. This flowchart is described from the aspect of the microprocessor 120, to further illustrate the detailed action of the temperature value processing method. First of all, a currently sensed temperature value T_Value(n) is obtained and input to the buffer 210, where n is a positive integer (Step S402). Next, the temperature values currently stored in the buffer 210 are sorted according to a predetermined rule (Step S404). Next, the high threshold value H_OT and the low threshold value L_OT are determined based on the sorted temperature values (Step S406). Next, whether the currently sensed temperature value T_Value(n) is between the high threshold value H_OT and the low threshold value L_OT is determined (Step S408). If so, the currently sensed temperature value T_Value (n) is output (Step S410). If not, it means that the currently sensed temperature value T_Value (n) is out of the proper range and the latest output temperature value Last_Value instead of the currently sensed temperature value T_Value (n) is output (Step S412).

As discussed above, the proposed temperature value processing method is capable of effectively filtering out the extremes of the sensed temperature values and preventing the heat-dissipation mechanism of the electronic device from overreacting to a transient and dramatic change of the sensed temperature values. Compared to the conventional design, in the proposed method, the sensed temperature values can be immediately reported right after the electronic device powers on, and there is no need to wait for a period of time and report the temperature values after the end of the period. In addition, compared to the moving average method of the conventional design, in the proposed method, the actual sensed temperature value can be reported more quickly. In addition, in the proposed method, the extremes of the sensed temperature values can be effectively filtered out, and there is no need to process the temperature values separately based on a high-temperature region and a non-high temperature region. That is, the uniformity of the temperature filtering is assured, and the filter design is easier than the conventional design. In addition, since the proposed filter does not require complicated mathematical operations, it can be applied to microprocessors with low operation efficiency. However, the proposed filter can also be further expanded to be designed as a high-order filter to increase the accuracy of filtering.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
   a thermal sensor, configured to sense an internal temperature of the electronic device and provide a plurality of temperature values according to the sensing result; and
   a microprocessor, coupled to the thermal sensor and configured to receive the temperature values, wherein the microprocessor determines a high threshold value and a low threshold value according to the temperature values and sequentially filters the temperature values according to the high threshold value and the low threshold value,
   wherein when one of the temperature values is not higher than the high threshold value and is not lower than the low threshold value, the microprocessor outputs the temperature value, and when the temperature value is higher than the high threshold value or is lower than the low threshold value, the microprocessor outputs a predetermined temperature value instead of the temperature value.

2. The electronic device as claimed in claim 1, wherein the predetermined temperature value is a temperature value which was previously output by the microprocessor.

3. The electronic device as claimed in claim 1, wherein the microprocessor further comprises a threshold value generator and a filter, the threshold value generator comprises:
- a buffer, configured to store the temperature values;
- a sorting device, configured to sort the temperature values according to a predetermined rule and generate a sequence of sorted temperature values; and
- a threshold value determination device, configured to select a first value among the temperature values selected from a beginning of the sequence of sorted temperature values to a median of the sequence of sorted temperature values, select a second value among the temperature values selected from the median of the sequence of sorted temperature values to the last of the sequence of sorted temperature values, determine an offset according to the first value and the second value and determine the high threshold value and the low threshold value according to the first value, the second value and the offset, and
- wherein the threshold value generator is configured to provide the high threshold value and the low threshold value to the filter.

4. The electronic device as claimed in claim 3, wherein the offset relates to a difference between the first value and the second value.

5. The electronic device as claimed in claim 3, wherein the low threshold value is a calculation result of the first value and the offset, and the high threshold value is a calculation result of the second value and the offset.

6. A method for processing temperature values of an electronic device, comprising:
- sensing an internal temperature of the electronic device and generating a plurality of temperature values according to the sensing result;
- determining a high threshold value and a low threshold value according to the temperature values; and
- sequentially filtering the temperature values according to the high threshold value and the low threshold value, wherein when one of the temperature values is not higher than the high threshold value and is not lower than the low threshold value, the temperature value is output, and when the temperature value is higher than the high threshold value or is lower than the low threshold value, a predetermined temperature value is output instead of the temperature value.

7. The method as claimed in claim 6, wherein the predetermined temperature value is the latest output temperature value.

8. The method as claimed in claim 6, wherein the step of determining the high threshold value and the low threshold value according to the temperature values further comprises:
- sorting the temperature values according to a predetermined rule to generate a sequence of sorted temperature values;
- selecting a first value among the temperature values selected from a beginning of the sequence of sorted temperature values to a median of the sequence of sorted temperature values;
- selecting a second value among the temperature values selected from the median of the sequence of sorted temperature values to the last of the sequence of sorted temperature values;
- determining an offset according to the first value and the second value;
- determining the high threshold value and the low threshold value according to the first value, the second value and the offset; and
- providing the high threshold value and the low threshold value to a filter for sequentially filtering the temperature values according to the high threshold value and the low threshold value.

9. The method as claimed in claim 8, wherein the offset relates to a difference between the first value and the second value.

10. The method as claimed in claim 8, wherein the low threshold value is a calculation result of the first value and the offset, and the high threshold value is a calculation result of the second value and the offset.

* * * * *